United States Patent [19]

Bhavsar

[11] E Re. 30,214

[45] Reissued Feb. 19, 1980

[54] TUNNEL-TYPE COMMERICAL-DUTY WASHING MACHINE

[76] Inventor: Guy M. Bhavsar, 68 Boulevard des Belges, Lyon, Rhône, France

[21] Appl. No.: 10,261

[22] Filed: Feb. 7, 1979

Related U.S. Patent Documents

Reissue of:

[64] Patent No.: 4,020,659
Issued: May 3, 1977
Appl. No.: 592,673
Filed: Jul. 2, 1975

[30] Foreign Application Priority Data

Jul., 1974 [FR] France ..... 74 23898

[51] Int. Cl.[2] ..... D06F 21/04; D06F 31/00; D06F 37/06

[52] U.S. Cl. ..... 68/27; 68/58; 68/140; 68/142

[58] Field of Search ..... 68/9, 10, 27, 58, 140, 68/142-146, 157, 158, 210

[56] References Cited

U.S. PATENT DOCUMENTS

| | | | |
|---|---|---|---|
| 2,056,803 | 10/1936 | Failing | 68/9 |
| 2,337,137 | 12/1943 | Thompson et al. | 68/144 X |
| 2,645,914 | 7/1953 | Sessions | 68/10 |
| 2,700,287 | 1/1955 | Sulzmann | 68/27 |
| 3,878,699 | 4/1975 | Steinort | 68/145 |

*Primary Examiner*—Philip R. Coe
*Attorney, Agent, or Firm*—Karl F. Ross

[57] ABSTRACT

A tunnel-type commerical-duty washing machine has a horizontally elongated housing subdivided by a succession of partitions into a succession of compartments each provided with a generally cylindrical foraminous drum. Each drum is provided with a respective foraminous scoop formed from a first generally cylindrical section having an edge attached to the outer wall and extending between the end walls of the drum and a second generally frustoconical section forming a continuation of the cylindrical section and having a side edge joined to one of the end walls over a major arc of the periphery of an aperture in one of the end walls. Thus the drums may be oscillated back and forth to agitate clothing, but when rotated through greater than a predetermined angle the scoop will pick up the articles of clothing in the drum and displace them axially out of the drum.

18 Claims, 10 Drawing Figures

TUNNEL-TYPE COMMERICAL-DUTY WASHING MACHINE

Matter enclosed in heavy brackets [ ] appears in the original patent but forms no part of this reissue specification; matter printed in italics indicates the additions made by reissue.

FIELD OF THE INVENTION

The present invention relates to an apparatus for treating a textile article. More particularly this invention concerns a commercial-duty laundry washing machine.

BACKGROUND OF THE INVENTION

Although the standard home washing machine has been developed and perfected to a high degree, large-capacity machines such as used in commercial laundries, hospitals, collectives, and the like have remained relatively crude. The most recent development in such commercial washing machines has been so-called continuous washers which are formed with an elongated housing having an input end and an outlet end. Laundry may be continuously introduced into the input end and is continuously expelled from the output end. Such an arrangement, referred to as a washing tunnel, is internally subdivided into several zones respectively responsible for the soaking, prewashing, washing, and rinsing of the articles introduced into the inlet end. In each zone the water is maintained at a predetermined temperature and various washing products are added. As a rule the water is circulated from the outlet end back toward the input end.

In the commonest type of such devices inside the longitudinally elongated cylindrical housing there is provided a similarly shaped drum. The entire arrangement is tipped slightly toward the output end so that as the internal drum is rotated the clothing and the like within it is tumbled and slowly progresses toward the outlet end. With such an arrangement some articles are washed much more thoroughly than others. In addition the simple tumbling action caused by continuous rotation of the treatment drum is not on the whole as effective as an agitation or oscillation of this drum would be.

Attempts have been made to overcome these disadvantages by providing a central compartmented drum in the housing forming a spiral with a succession of flat partitions alternating with helical ones. In such an arrangement the different laundry articles advance at approximately the same speed and do not get mixed together. Such a system has, however, the considerable disadvantage that the central drum is extremely expensive and difficult to manufacture. It must be delivered to the site as a single unit and does not allow the type of washing operation to be altered by addition or removal of stages. In addition it is necessary that the articles in each compartment be subjected to exactly the [ame] *same* type of tumbling or agitating movement so that, for instance, a still-standing presoak cannot be carried out at the same time as a tumbling or oscillating wash cycle. In some arrangements (see German Pat. No. 1,948,045) the drum is rotated continuously in one direction whereas in other systems (see U.S. Pat. No. 3,103,802) the drum is oscillated back and forth about its axis. Continuous rotation in the same direction or tumbling has been found to be relatively ineffective for thorough washing, and oscillation through less than 270° has similarly been found to be of very reduced effectiveness.

So-called modular systems have been described (see British Pat. No. 516,772 and U.S. Pat. No. 2,056,803). In such systems the separate sections of the drum are nonetheless constrained to rotate together once the assembly is installed so that once again a still-standing soak is impossible during a washing operation in the same machine. Furthermore the laundry must be transferred from each chamber to the next chamber simultaneously so that a very large drive motor must be employed and heavy-duty power circuits installed to handle the load.

It is also known to provide vanes within the drum of a washing machine (see French Pat. No. 1,226,393, German Pat. No. 1,290,909, and U.S. Pat. Nos. 3,084,531 and 3,364,588). In such a system the vane is built such that rotation of the drum in one direction tumbles the laundry within the drum, but rotation in the opposite direction displaces it axially to unload the drum. Such a system nonetheless relies on the above-described ineffective tumbling effect. In addition such an arrangement frequently causes a considerable quantity of water to be dumped out of the drum when it is reversed.

OBJECTS OF THE INVENTION

It is therefore an object of the present invention to provide an improved apparatus for treating a textile article.

Another object is the provision of an improved apparatus for continuously washing, dyeing, drying, or otherwise treating a textile article.

A further object is to provide a tunnel-type washing machine suitable for use in a commercial laundry or the like.

Yet another object is the provision of such a commercial-duty washing machine which is inexpensive to manufacture, readily adaptable to different types of washing and treating operations, of low current consumption, easy serviceability, and simple installation.

SUMMARY OF THE INVENTION

These objects are attained according to the present invention in an apparatus for treating a textile article which comprises at least one drum rotatable about a horizontal axis and provided with an outer wall defining a chamber and with a pair of axially spaced end walls flanking the chamber and each formed at the axis with a respective aperture. A scoop is provided in the drum which is effective on rotation through more than a predetermined angle for lifting an article being treated from the outer wall and displacing same out of the chamber through one of the apertures and which is ineffective on oscillation of the drum through less than the predetermined angle for lifting the [aritcle] *article* from the outer wall. In accordance with this invention the scoop is at least partially foraminous and is formed from a first generally cylindrical section having an edge attached to the outer wall and extending between the end walls and a second generally frustoconical section forming a continuation of the cylindrical section and having a side edge joined to one of the end walls over a major arc of the periphery of the one aperture.

With the apparatus according to the present invention it is possible to employ a highly efficient agitating oscillation motion of the drum for treating the textile article. In accordance with this invention this predetermined oscillation angle may be substantially 360° so that very thorough cleaning, dyeing, rinsing, or similar liquid treatment is possible. Similarly when the article being treated is lifted by the foraminous scoop most of the liquid contained in it will run out back into the drum before [it] *the article* is transferred out of the drum so that liquid loss and transfer from one treatment zone to the next is minimized.

According to another feature of this invention the apparatus comprises a housing having an inlet end and an outlet end and provided between these ends with a succession of upright partitions forming in the housing a succession of separate compartments. Each partition is formed with a throughgoing opening and each compartment is provided with one such drum. The drums are coaxial with the axis passing through the partitions at the openings. Each frustoconical section is joined to that end wall of the respective drum turned toward the outlet end of the housing.

In such an arrangement the end of the cylindrical section joined to the outer wall lies generally in a plane including the drum axis and angularly bisecting the major arc where the frustoconical section joins the periphery. Thus the drum may be oscillated back and forth through 360° so as effectively to wash the articles enclosed in it, and oscillation through an extra 180° will automatically scoop up and discharge all of the articles in the housing, while positioning the scoop so that fresh articles can be introduced into the other aperture of the drum so as to fall into the body of liquid in the bottom of the chamber.

With such a system all of the drums may be separately supported for independent rotation and all separately driven for independent rotation and oscillation. Thus it is possible in a single washing machine to briefly agitate and then let the [aritcls] *articles* soak in the upstream presoak drum while simultaneously violently agitating articles further downstream in the washing drum. Different agitation speeds and actions can be provided in each drum and the discharge time from each drum into the downstream drum can be staggered, usually starting with the [furtherst] *furthest* downstream drum, so as to minimize instantaneous current consumption and shock to the system.

In accordance with this invention the housing is formed of a plurality of independent compartments each having its own drive and drum. Each compartment comprises an upper half and a lower half, with the upper half being provided with a drive and the lower half being provided with rollers for rotatably supporting the drum. Thus it is possible to expand the system to any size needed, and the installation is relatively simple as the assemblies are merely bolted together one next to the other. A programmer controls the operation of all of the drives and for the various means for introducing treatment fluids into the compartments. In case of difficulty with a single drum it is a relatively simple operation to open the respective compartment and service or replace the problem unit. In practice it has been found that the arrangement is overall much cheaper than known commercial-duty washing machines of similar capacity. In addition downtime is considerably less as the apparatus is quite simple, and the device is extremely flexible so that it is possible to use it for all kinds of washing, dyeing, and other operations.

Each drive means according to the present invention comprises a combined motor transmission having an output side to which is operatively connected a pinion that meshes with a chain wrapped around the respective drum. The pinion is itself driven by a chain and is mounted on the end of an arm pivotal about an axis parallel to the drum axis and biased by means of a spring toward the drum so as to insure good coupling of the two elements together. Such an arrangement is extremely simple and has a very long service life.

BRIEF DESCRIPTION OF THE DRAWING

The above and other objects, features, and advantages of the invention will become more readily apparent from the following description, reference being made to the accompanying drawing *in* which.

SPECIFIC DESCRIPTION

Figure 1:
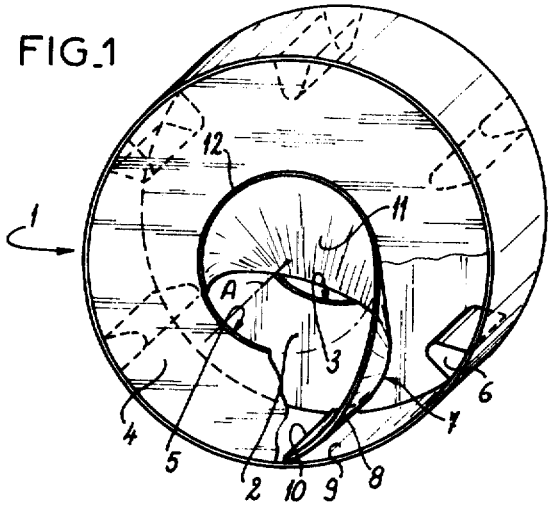
FIG. 1 is a perspective view of a drum according to the present invention, partly broken away.

As shown in FIG. 1 a drum 1 according to the present invention is formed as a cylindrical body of revolution centered on an axis A and having a planar inlet end wall 2 formed with a central circular hole 3 and a planar outlet end wall 4 formed with a central circular hole 5. An outer wall 9 defines with the end walls 2 and 4 a cylindrical chamber centered on the axis A. Six angularly equispaced and axially elongated agitator vanes 6 are provided on the outer wall 9 extending radially inwardly.

A scoop 7 is provided in the drum 1 and is formed generally of a first generally cylindrical part 8 secured to the outer wall 9 along a straight edge 10 parallel to the axis A. The scoop 7 also comprises a generally frustoconical section 11 forming a continuation of the section 8 and secured to the periphery of the opening 5 in the wall 4 along an arc 12 between 200° and 250°, here 225°. A plane P bisects the arc 12, and passes through the axis A and edge 10. This scoop 7 is foraminous, being formed of a perforated sheet of stainless steel.

Figure 7:
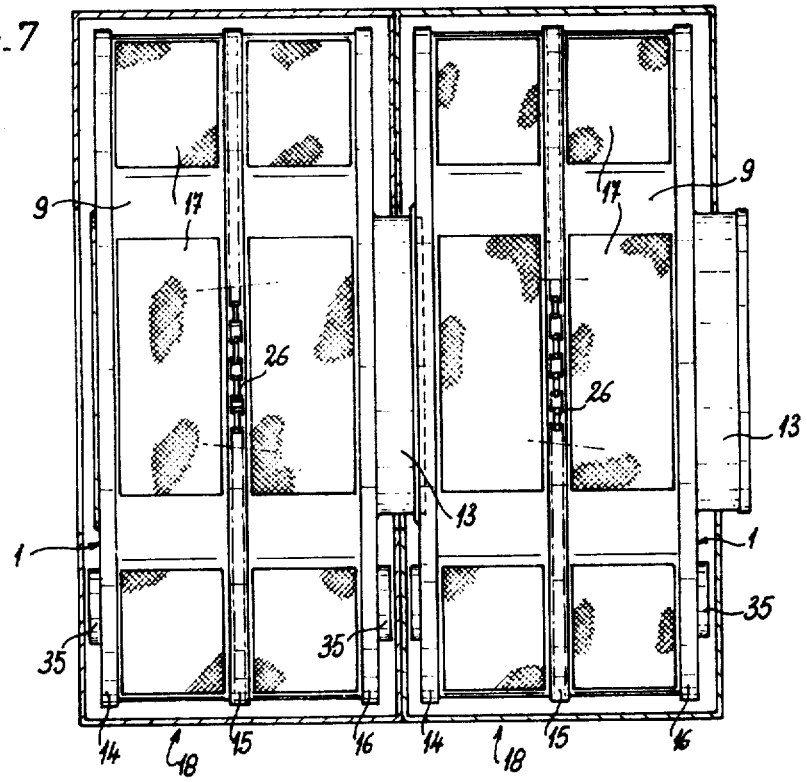
FIG. 7 is a large-scale view of a detail of FIG. 6.

As also shown in FIG. 7 each drum 1 is formed with an axially extending cylindrical collar 13 forming an extension of the outlet opening 5. In addition steel bands 14 and 16 at the end walls 2 and 4, respectively, reinforce the drum; axially centered between these bands 14 and 16 is a strip 15 constituted by a bicycle-type chain 26. The outer wall 9 is perforated as indicated at 17 between the bands 14, 15, and 16 and the vanes 6.

Figure 6:
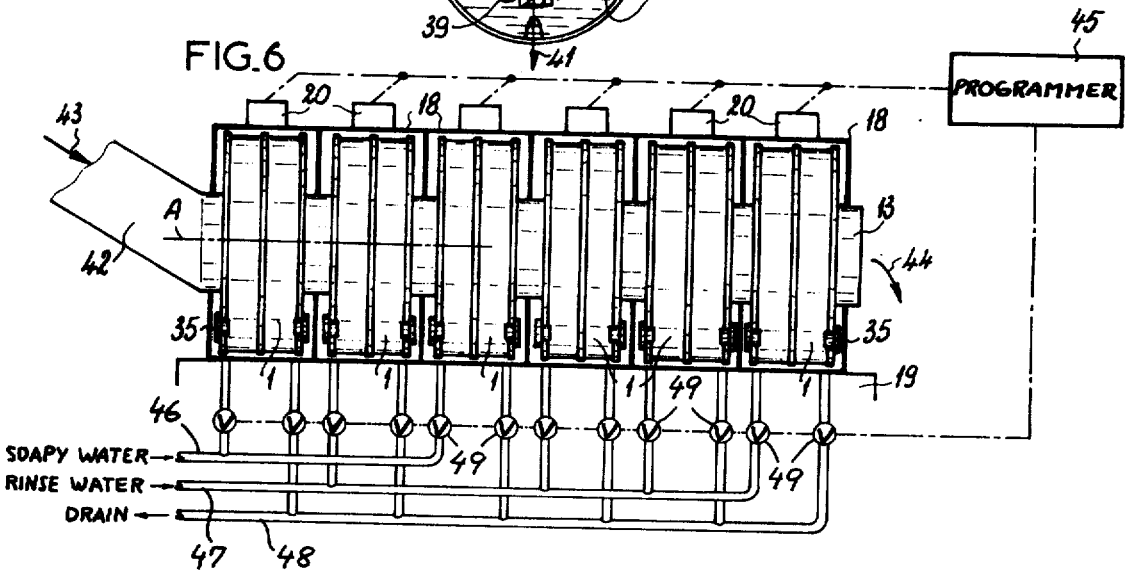
FIG. 6 is a longitudinal section through a washing apparatus according to the present invention.

As also shown in FIG. 6 each of the drums 1 may be mounted in a respective housing 18 itself mounted on a common support 19 with all of the drums coaxial. Individual drives 20 described below are provided for each drum 1. A programmer 45 is connected to all of the drives 20. In addition soapy water may be fed into some of the compartments through an inlet line 46, rinse water may be fed into some of the compartments through an inlet line 47, and all of the compartments may be drained through an outlet line 48. Valves 49 connected also to the programmer 45 serve to control the introduction of soapy water or rinse water and the draining of the housings 18.

Figure 8:
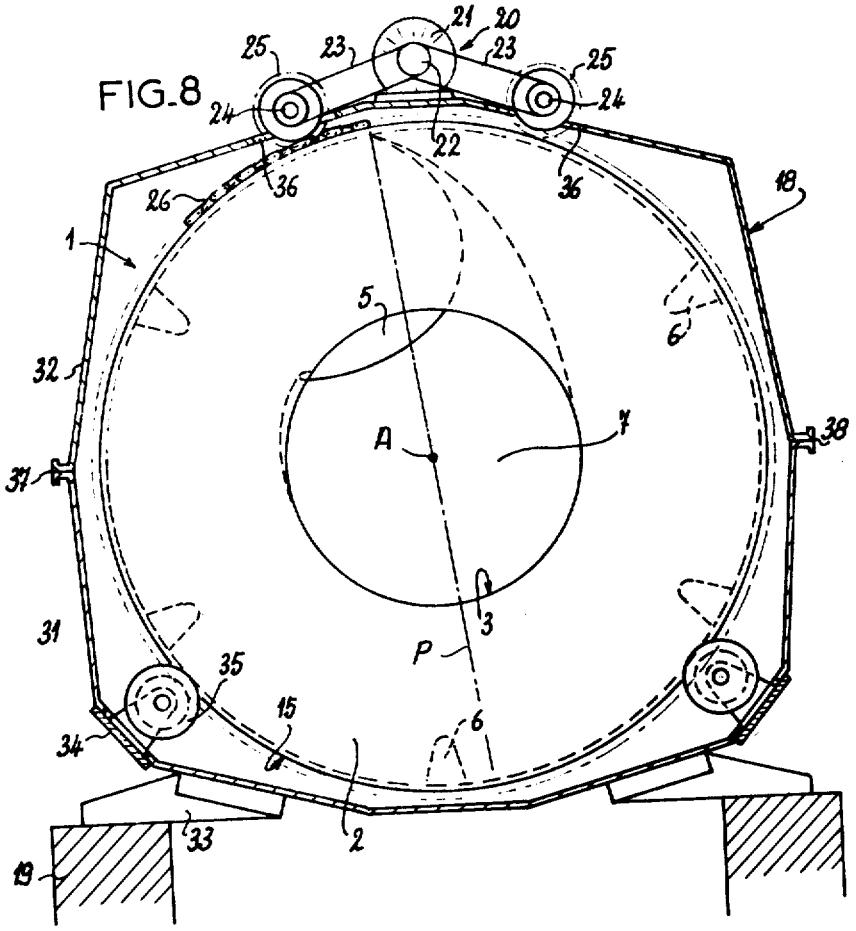
FIG. 8 is a cross section through the detail shown in FIG. 7.

As best shown in FIG. 8 each of the housings 18 is formed of a lower half 31 having feet 33 and an upper half 32 joined to the lower half along lateral seams 37 and 38 lying in a horizontal plane with the axis A. Each drum 1 is mounted in such a housing 18 by means of four rollers 35 secured at 34 to the lower half 31 and cradling the drum.

Figure 9:
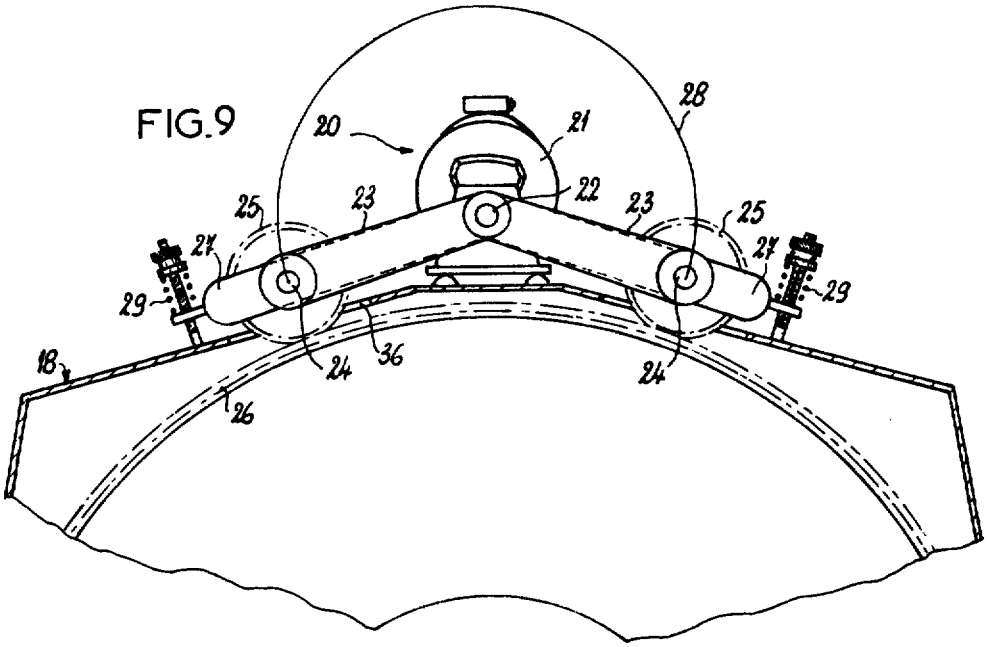
FIG. 9 is a large-scale view of the drive unit of FIG. 8.
Figure 10:
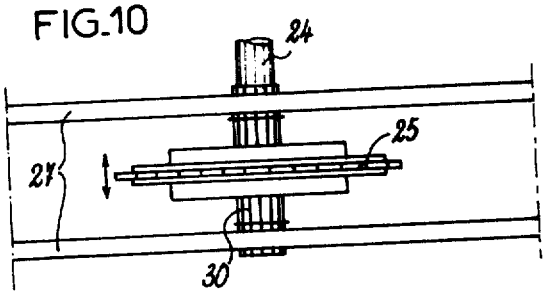
FIG. 10 is a top view of a portion of the drive unit of FIG. 9.

The drive 20 as shown in FIGS. 8, 9 and 10 comprises a motor-transmission 21 having an output shaft 22 connected via chains 23 to a pair of splined shafts 24 journaled each in a pair of arm 27 pivotal about the axis of the shaft 22 as shown at 28. A sprocket-pinion 35 is mounted between these arms 27 on each splined shaft 24 so as to be rotationally coupled thereto but limitedly axially displaceable thereto also. A spring 29 presses each of the sprockets 25 radially inwardly through a hole 36 in the upper half 32 into mesh with the respective chain 26. Since one such sprocket 25 is provided to each side of the motor-transmission 21 very positive coupling is obtained between the output side 22 of the motor 21 and the drum 1. By the same token, however, jamming of the respective drum 1 will not cause the motor to burn out as the sprockets will merely ride up and slip on the chain 26.

Figure 2:
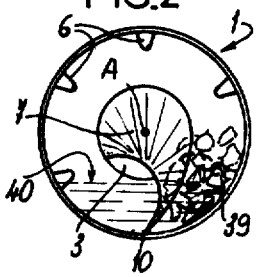
FIGS. 2 through 5 are cross sections through the drum of FIG. 1, in reduced scale, illustrating operation of the drum according to this invention.
Figure 3:
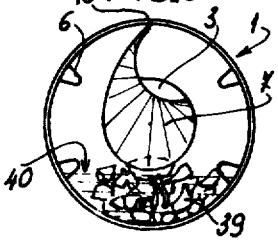

In accordance with the present invention and as illustrated in FIGS. 2 through 6, the apparatus functions as follows:

Articles of clothing are loaded into the inlet end of housing 18 furthest upstream via a chute 42 in the direction of arrow 43 (FIG. 6). The programmer 45 is operated so as to introduce the requisite soapy water into this upstream housing 18. Thereafter the drive 20 is cycled so as to oscillate the drum 1 through 360° counterclockwise and then counterclockwise repeatedly, so that the articles of clothing 39 are tumbled in the liquid 40 in the drum 1 as shown in FIGS. 2–4.

Figure 4:
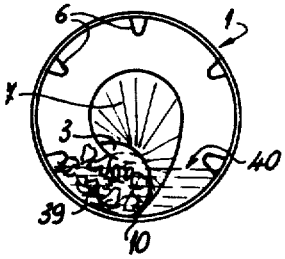
Figure 5:
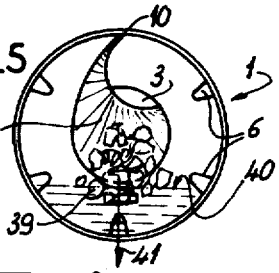

After sufficient treatment the programmer 45 rotates the drum from the position of FIG. 4 through another 180° to the position of FIG. 5 so that the scoop 7 picks up the [aritcles] *articles* of clothing from the bath 40 and discharges them as indicated by arrow 41 into the next downstream drum 1.

At this time another load may be introduced as indicated by arrow 43, rinse water may be fed into the second downstream housing, and simultaneous washing and rinsing may take place.

This operation is continued until there is a load of laundry in each of the drums, here six in number. The device is operated so that the first load is discharged and the other loads are all moved up one after the other to free the furthest upstream drum so that a seventh load may be introduced into it. In this manner continuous washing is possible. It is possible, indeed to only provide minimal agitation in the furthest upstream drum and then to allow the articles merely to soak. On the contrary, the other loads may simultaneously be agitated for washing and rinsing in the further downstream drums.

A very effective agitation of the articles 39 is achieved for most thorough washing period. The displacement of the drums from the position of FIG. 4 to the position of FIG. 6 is executed very slowly so as to insure that a [miximum] *maximum* amount of the liquid held in the articles 39 drips back into the compartment before these articles are displaced into the next downstream drum.

After exiting as indicated by arrow 44 the furthest downstream drum the articles may be fed to an extractor or press.

I claim:

1. An apparatus for treating a textile article with a liquid, said apparatus comprising:

at least one drum rotatable about a horizontal axis and provided with an outer wall defining a chamber and with a pair of axially spaced end walls flanking said chamber and each formed at said axis with a respective aperture;

scoop means in said drum effective on rotation thereof through more than a predetermined angle for lifting from said outer wall and axially displacing said article out of said chamber through one of said apertures and ineffective on oscillation of said drum through less than said predetermined angle for lifting said article;

drive means for oscillating and rotating said drum about said axis, said scoop means being at least partially foraminous and formed from a first generally cylindrical section having an edge attached to said outer wall and extending between said end walls and a second generally frustoconical section forming a continuation of said cylindrical section and having a side edge joined to one of said end walls over a major arc of the periphery of said one aperture, said edge of said cylindrical section lying generally in a plane including said axis and angularly bisecting said major arc where said frustoconical section joins said periphery;

a housing means having an inlet end *and an outlet end* and [provided] *providing* between said ends individual housings forming a succession of upright partitions defining respective compartments and each formed with a throughgoing opening, each compartment being provided with one such drum, said drums being coaxial with said axis passing through said openings, each frustoconical section being joined to that end wall of the respective drum turned toward said outlet end; and means for introducing treatment fluids into said compartments, said drums being at least partially foraminous.

2. The apparatus defined in claim 1 wherein said predetermined angle is substantially 360°.

3. The apparatus defined in claim 1 wherein said drive means for each drum comprises:

a motor transmission carried on said [housng] *housing* and having an output side;

a pinion operatively connected to said output side[,]; and[,]

a chain wrapped around the respective drum and in mesh with said pinion.

4. The apparatus defined in claim 3 wherein said drive means for each drum further comprises means for radial displacement of said pinion relative to said axis, and spring means for urging said pinion radially inwardly against said chain.

5. The apparatus defined in claim 4 wherein each output side has a splined shaft extending axially, said pinion being limitedly axially displaceable on said shaft.

6. The apparatus defined in claim 1, wherein each of said housings is formed from an upper half and a lower half joined at a generally horizontal axial plane, said drive means being provided on said upper half, said lower half being provided with means for rotatably supporting said drum.

7. The apparatus defined in claim 6 wherein said means for supporting each drum includes a plurality of rollers cradling said drum and rotatable about respective axes parallel to said axis.

8. The apparatus defined in claim 1 wherein each of said drums is rotatable independently of the others, said drive means including respective drives each operatively connected to a respective one of said drums for [ratating] *rotating* same.

9. A washing machine comprising:

housing means including a plurality of axially aligned axially open housings centered on a common axis and disposed adjacent one another to define a succession of axially separated compartments;

a respective perforated drum in each of said compartments, said drums being rotatable about a substantially common axis and being axially open;

scoop means in said drums effective on rotation thereof through more than a predetermined angle for lifting laundry from each drum and axially displacing same into a successive drum, said scoop means being ineffective on angular oscillation of said drums through less than said predetermined angle;

means for introducing liquid into and removing it from said housings; and drive means for respectively rotating the drums and angularly oscillating same in the respective housing, said scoop means of each drum being formed from a first generally cylindrical section and a second frustoconical section, each of said drums having an axial aperture in an end wall through which laundry is deposited in the next drum, each of said cylindrical sections having an edge attached to a peripheral wall of the respective drum and each of said frustoconical sections having a side edge joined to the respective end wall over a major arc of the periphery of the [apeture] *aperture* thereof, the said edge of each cylindrical section lying generally in a plane including said axis and angularly bisecting the respective major arc where the respective frustoconical section joins the respective aperture periphery.

*10. An apparatus for treating a textile article with a liquid, comprising:*

*a plurality of axially spaced at least partially foraminous drums rotatable about a common horizontal axis and each provided with a respective outer wall defining a chamber and with a pair of axially spaced end walls flanking said chamber, each of said end walls being formed at said axis with a respective aperture;*

*respective scoop means in each drum effective on rotation thereof in one sense through more than a predetermined angle for lifting from the respective outer wall and axially displacing said article out of the respective chamber through a respective one of said apertures into another of said drums and ineffective on rotation of the drum, in the opposite sense for lifting said article;*

*drive means for angularly displacing said drums in said one sense through at least said predetermined angle and for rotating said drums in said opposite sense, each of said scoop means being at least partially foraminous and formed from a first generally cylindrical section having an edge attached to the respective outer wall and extending between the respective end walls, and a second generally frustoconical section forming a continuation of said cylindrical section and having a side edge joined to one of the respective end walls over a major arc of the periphery of the respective said one aperture, said edge of said cylindrical section lying generally in a plane including said axis and angularly bisecting the respective major arc where the respective frustoconical section joins the respective periphery;*

*housing means having an inlet end and an outlet end and providing between said ends individual housings forming a succession of upright partitions defining respective compartments each formed with a throughgoing opening and, each compartment receiving a respective one of said drums with the apertures thereof being aligned with said opening, each frustoconical section being joined at that end wall of the respective drum turned toward said outlet end; and*

*means for introducing treatment fluids into said compartments.*

*11. The apparatus defined in claim 10 wherein said predetermined angle is substantially 360°.*

*12. The apparatus defined in claim 10 wherein said drive means includes:*

*a motor transmission carried on said housing and having an output side;*

*a pinion operatively connected to said output side; and*

*a chain wrapped around one of said drums and meshing with said pinion.*

*13. The apparatus defined in claim 12 wherein said drive means further comprises means for radially displacing said pinion relative to said axis, and spring means for urging said pinion radially against said chain.*

*14. The apparatus defined in claim 12 wherein said output side has a splined shaft extending axially, said pinion being limitedly axially displaceable on said shaft.*

*15. The apparatus defined in claim 10 wherein each of said housings is formed from an upper half and a lower half joined at a generally horizontal axial plane, said drive means being provided on said upper half, said lower half being provided with means for rotatably supporting said drums.*

*16. The apparatus defined in claim 15 wherein the means for supporting each drum includes a plurality of rollers cradling said drum and rotatable about respective axes parallel to the first-mentioned axis.*

*17. The apparatus defined in claim 10 wherein each of said drums is rotatable independently of the others, said drive means including respective drives each operatively connected to a respective one of said drums for rotating same.*

*18. A washing machine comprising:*

*housing means including a plurality of axially aligned axially open housings disposed adjacent one another to define a succession of axially separated compartments along a common axis;*

*a respective perforated drum in each of said compartments, said drums being rotatable about said common axis and being axially open;*

*scoop means in each of said drums effective on rotation thereof in one sense through more than a predetermined angle for lifting laundry from each drum and axially displacing same into a successive drum, and scoop means being ineffective to lift laundry upon rotations of said drums in the opposite sense;*

*means for introducing liquid into and removing it from said housing; and*

*drive means for rotating the drum in said senses, said scoop means of each drum being formed from a first generally cylindrical section and a second frustoconi-*

*cal section, each of said drums having an axial aperture in an end wall through which laundry is disposed in the next drum, each of said cylindrical sections having an edge attached to a peripheral wall of the respective drum and each of said frustoconical sections having a side edge joined to the respective end wall over a major arc of the periphery of the aperture thereof, the said edge of each cylindrical section lying generally in a plane including said axis and angularly bisecting the respective major arc where the respective frustoconical section joins the respective aperture peripherally.*

* * * * *